US012222669B2

(12) United States Patent
Totsuka

(10) Patent No.: US 12,222,669 B2
(45) Date of Patent: Feb. 11, 2025

(54) IMAGE FORMATION APPARATUS INCLUDING CLEANING MEMBER TO REMOVE ROLLER ADHERENTS

(71) Applicant: Oki Electric Industry Co., Ltd., Tokyo (JP)

(72) Inventor: Toshiyuki Totsuka, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/505,793

(22) Filed: Nov. 9, 2023

(65) Prior Publication Data

US 2024/0168428 A1 May 23, 2024

(30) Foreign Application Priority Data

Nov. 21, 2022 (JP) ................................ 2022-185556

(51) Int. Cl.
*G03G 21/00* (2006.01)
*G03G 15/01* (2006.01)

(52) U.S. Cl.
CPC ..... *G03G 21/0011* (2013.01); *G03G 15/0105* (2013.01); *G03G 2215/00679* (2013.01); *G03G 2221/1654* (2013.01); *G03G 2221/1687* (2013.01)

(58) Field of Classification Search
USPC ........................................................ 399/350
See application file for complete search history.

(56) References Cited

FOREIGN PATENT DOCUMENTS

| | | | |
|---|---|---|---|
| JP | 2004075239 A | * | 3/2004 |
| JP | 2017-24869 A | | 2/2017 |

* cited by examiner

*Primary Examiner* — Quana Grainger
(74) *Attorney, Agent, or Firm* — METROLEX IP LAW GROUP, PLLC; Robert L. Scott, Esq.

(57) ABSTRACT

One or more embodiments may be an image formation apparatus that may include: a roller attached to an apparatus main body to convey a medium; and a pivot member pivotable between a closed position and an open position relative to the apparatus main body. The pivot member includes: a cleaning member that is in contact with the roller to thereby remove adherents from the roller in a state where the pivot member is in the closed position; a first storage section provided to accommodate the adherents removed by the cleaning member; and a second storage section provided communicating with the first storage section through an opening. The pivot member is configured such that the removed adherents that is accommodated in the first storage section moves from the first storage section to the second storage section when the pivot member pivots from the closed position to the open position.

13 Claims, 11 Drawing Sheets

IMAGE FORMATION APPARATUS INCLUDING CLEANING MEMBER TO REMOVE ROLLER ADHERENTS

CROSS REFERENCE TO RELATED APPLICATIONS

This application claims priority based on 35 USC 119 from prior Japanese Patent Application No. 2022-185556 filed on Nov. 21, 2022, entitled "IMAGE FORMATION APPARATUS", the entire contents of which are incorporated herein by reference.

BACKGROUND

The disclosure may relate to an image formation apparatuses configured to form an image on a medium.

There has been known an image formation apparatus that forms an image on a medium conveyed by a conveyance roller. For example, Patent Document 1 (Japanese Patent Application Publication No. 2017-24869) proposes an image formation apparatus that includes an opening/closing frame provided with a cleaning member that is in contact with a surface of a conveyance roller to scrape off matter (adherents) adhered to a surface of a conveyance roller.

SUMMARY

However, in the configuration described above, the adherents scraped off from the conveyance roller accumulate on the cleaning member.

An object of one or more embodiments of the disclosure may be to suppress deterioration in an image quality caused by adherents adhered to a roller that conveys a medium.

An aspect of the disclosure may be an image formation apparatus that may include: an apparatus main body including an image formation unit; a roller attached to the apparatus main body and configured to convey a medium; and a pivot member provided pivotable about a rotation axis between a closed position and an open position with respect to the apparatus main body. The pivot member includes: a cleaning member that is in contact with the roller to thereby remove adherents adhered to the roller from the roller in a state where the pivot member is in the closed position; a first storage section spaced apart from a contact position between the cleaning member and the roller and provided to accommodate the adherents removed by the cleaning member; and a second storage section that is provided communicating with the first storage section through an opening and configured to accommodate therein the removed adherents. The pivot member is configured such that the removed adherents that is accommodated in the first storage section moves from the first storage section to the second storage section when the pivot member rotates from the closed position to the open position.

Another aspect of the disclosure may be an image formation apparatus that may include: an apparatus main body including an image formation unit; a roller configured to convey a medium; and a pivot member provided pivotable about a rotation axis between a closed position and an open position with respect to the apparatus main body. The pivot member includes: a cleaning member that is in contact with the roller to thereby remove adherents adhered to the roller from the roller in a state where the pivot member is in the closed position; a first storage section provided to accommodate the adherents removed by the cleaning member; and a second storage section that is provided communicating with the first storage section through an opening and configured to accommodate therein the removed adherents. When the pivot member is in the closed position, the first storage section is located lower than a lower end of the opening communicating with the second storage section, and when the pivot member pivots from the closed position toward the open position by a predetermined angle, the first storage section is located upper than the lower end of the opening communicating with the second storage section such that the removed adherents that is accommodated in the first storage section moves from the first storage section to the second storage section.

According to at least one of the aspects described above, the adherents on the roller is removed from the roller by the cleaning member and is then accommodated in the first storage section. Further, when the pivot member is rotated from the closed position to the open position, the removed adherents accommodated in the first storage section moves to the second storage section. Therefore, even if an amount of the removed adherents increases, it is possible to prevent the removed adherents from overflowing and adhering to the medium, thereby suppressing deterioration in image quality on the medium.

BRIEF DESCRIPTION OF DRAWINGS

FIGS. 2A and 2B are diagrams illustrating perspective views of the image formation apparatus according to a first embodiment, wherein FIG. 2A illustrates a state in which a front cover is in a closed position and FIG. 2B illustrates a state in which the front cover is in an open position;

DETAILED DESCRIPTION

Figure 1:
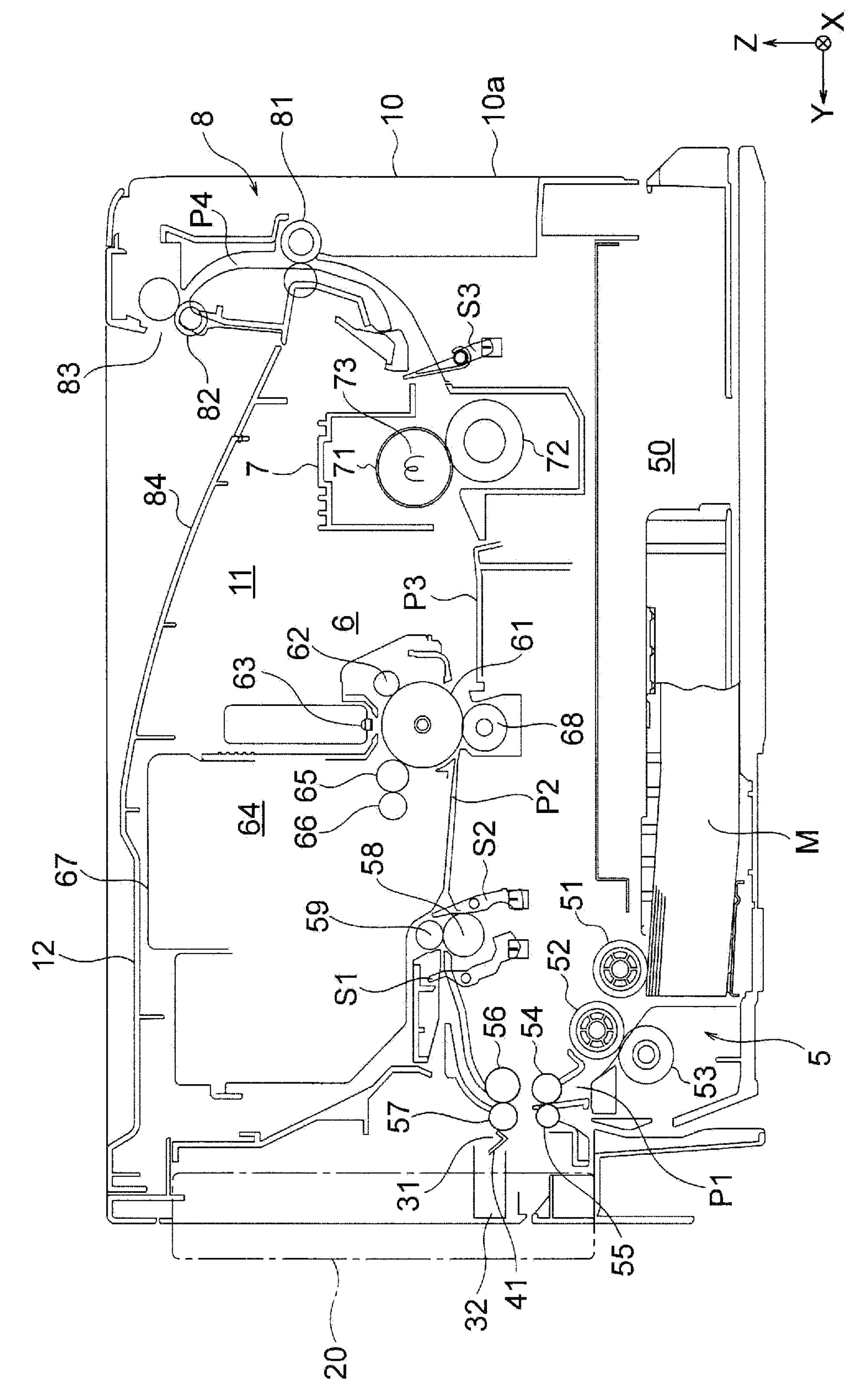
FIG. 1 is a diagram illustrating a view of an image formation apparatus according to a first embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

First Embodiment (Image Formation Apparatus)

First, an image formation apparatus according to a first embodiment is described. FIG. 1 is a diagram illustrating a view of an image formation apparatus 1. The image formation apparatus 1 may be a printer configured to form images using an electrophotographic process.

The image formation apparatus 1 includes a medium feeder 5 (a medium supply device) configured to supply a medium M such as printing paper, an image formation unit 6 configured to form an image on the medium M, a fixation device 7 configured to fix the image on the medium M, a medium discharging part 8 (a medium discharging device 8) configured to discharge the medium M, and a housing 10 that accommodates therein the medium feeder 5, the image formation unit 6, the fixation device 7, and the medium discharging part 8. An upper portion of the housing 10 is covered with a top cover 12 that can be opened and closed.

The medium feeder 5 includes a media cassette 50 serving as a media storage, a pickup roller 51, a feed roller 52, and a retard roller 53. The media cassette 50 accommodates therein media M such as printing paper or the like. The pickup roller 51 pulls out the media M one by one from the media cassette 50. The feed roller 52 and the retard roller 53 separate the pulled-out media M one by one and send the medium M to a medium conveyance path P1.

A conveyance roller 54 serving as a first conveyance roller, a conveyance roller 56 serving as a second conveyance roller, and a regist roller 58 serving as a third conveyance roller are arranged along the medium conveyance path P1. Pinch rollers 55, 57 and 59, which are driven rollers, are opposed to the conveyance roller 54, the conveyance roller 56 and the regist roller 58, respectively.

A pair of the conveyance roller 54 and the pinch roller 55 and a pair of the conveyance roller 56 and the pinch roller 57 convey the medium M along the medium conveyance path P1. A pair of the regist roller 58 and the pinch roller 59 corrects a skew of the medium M conveyed along the medium conveyance path P1, and then conveys the medium M to the image formation unit 6 along a medium conveyance path P2.

Among these rollers, the pinch roller 57 serves as a cleaning target roller (or simply called a roller) that is to be cleaned by a cleaning member 41, which will be described later.

The image formation unit 6 includes a photosensitive drum 61 as an image carrier, a charging roller 62 as a charging member, a development roller 65 as a developer carrier, a supply roller 66 as a supply member, and a toner cartridge 67 as a developer container. An exposure head 63 as an exposure device is located so as to be opposed to the photosensitive drum 61.

The photosensitive drum 61 is a cylindrical member with a photosensitive layer formed on a surface of a conductive support. The photosensitive layer includes a stack of a charge generation layer and a charge transport layer. The photosensitive drum 61 rotates counterclockwise in the figure.

The exposure head 63 includes an array of LEDs (light emitting diodes) as light emitting elements and is configured to irradiate light onto the surface of the photosensitive drum 61 to form an electrostatic latent image thereon. The exposure head 63 is suspended and supported by the top cover 12.

The charging roller 62 is provided to be in contact with the surface of the photosensitive drum 61 and is configured to rotate along with the rotation of the photosensitive drum 61. The charging roller 62 is applied with a charging voltage to uniformly charge the surface of the photosensitive drum 61.

The development roller 65 is provided in contact with the surface of the photosensitive drum 61 and configured to rotate in a direction opposite to that of the photosensitive drum 61 (that is, at a contact portion between the development roller 65 and the photosensitive drum 61, the direction in which the surface of the development roller 65 moves is the same as the direction in which the surface of the photosensitive drum 61 moves). The development roller 65 is applied with a development voltage and configured to develop the electrostatic latent image on the surface of the photosensitive drum 61 with a toner (a developer).

The supply roller 66 is provided in contact with the surface of the development roller 65 and configured to rotate in the same direction as the development roller 1 (that is, at a contact portion between the supply roller 66 and the development roller 65, the direction in which the surface of the supply roller 66 moves is opposite to the direction in which the surface of the development roller 65 moves). The supply roller 66 is applied with a supply voltage and supplies toner to the development roller 65. The development roller 65 and the supply roller 66 constitute a development device 64 (a development unit 64).

The toner cartridge 67 is a detachable container that contains therein a toner serving as a developer. The toner cartridge 67 supplies the toner to the development device 64. The toner is, for example, black toner, but is not limited to this.

A transfer roller 68, serving as a transfer part or a transfer device, is provided in contact with the surface of the photosensitive drum 61. A transfer voltage is applied to the transfer roller 68 to transfer the toner image formed on the surface of the photosensitive drum 61 onto the medium M passing between the photosensitive drum 61 and the transfer roller 68. The medium M that has passed between the photosensitive drum 61 and the transfer roller 68 is conveyed to the fixation device 7 along the medium conveyance path P3 by the rotation of the photosensitive drum 61.

The image formation unit 6 is detachable from the housing 10 of the image formation apparatus 1. The image formation unit 6 may be referred to as a process unit. In an embodiment described herein, a configuration in which only a monochrome image is formed using the single image formation unit 6. However, the disclosure is not limited thereto. For example, a configuration in which a plurality of image formation units form color images of respective colors, such as yellow, magenta, cyan, black, etc. may be employed.

The fixation device 7 is arranged on a downstream side of the image formation unit 6 in the conveyance direction of the medium M. The fixation device 7 includes a fixation roller 71 and a pressure roller 72. The fixation roller 71 includes a built-in heater 73 such as a halogen lamp or the like. The pressure roller 72 is pressurized to the fixation roller 71. The fixation roller 71 and the pressure roller 72 heat and press the medium M to thereby fix the toner image onto the medium M.

The medium discharging part 8 includes a pair of discharging rollers 81 and a pair of discharging rollers 82 configured to convey the medium that has passed through the fixation device 7 along the medium conveyance path P4 and discharge the medium through a discharge port 83 to the outside. The top cover 12 includes a stacker 84 on which the discharged media are to be stacked.

Medium sensors S1, S2, and S3 configured to detect passage of the medium M are arranged on the medium conveyance paths P1 to P4. The medium sensors S1 and S2 are arranged upstream and downstream of the regist roller 58, respectively. The medium sensor S3 is arranged downstream of the fixation device 7.

A detection signal from the medium sensor S1 is used to determine a rotation start timing of the regist roller 58. A detection signal from the medium sensor S2 is used to determine an exposure start timing of the exposure head 63. A detection signal from the medium sensor S3 is used for detecting jam of the medium M.

In FIG. 1, an axial direction of the photosensitive drum 61 is referred to as an X direction. The X direction is parallel to an axial direction of each of the rollers in the image formation apparatus 1 and also is parallel to a width direction of the medium M being conveyed. A movement direction of the medium M as the medium M passes through the image formation unit 6 is referred to as a Y direction. The direction orthogonal to both of the X direction and the Y direction is referred to as a Z direction. In this case, the Z direction is the vertical direction.

For the Y direction, the medium conveyance direction when the medium M passes through the image formation unit 6 is referred to as a −Y direction (rear direction), and the opposite direction thereto is referred to as a +Y direction (front direction). For the X direction, a right hand direction and a left hand direction as seen along the +Y direction are referred to as a +X direction and a −X direction, respectively. For the Z direction, an upper direction and a lower direction in FIG. 1 are referred to as a +Z direction and a −Z direction, respectively. Note that these X, Y, and Z directions do not limit the orientation of the image formation apparatus 1.

The housing 10 and the components inside the housing 10 (including the medium feeder 5, the image formation unit 6 and the fixation device 7) are correctively referred to as an apparatus main body 11 of the image formation apparatus 1. That is, the image formation apparatus 1 includes the apparatus main body 11 and a front cover 20 attached thereto.

Figure 2A:
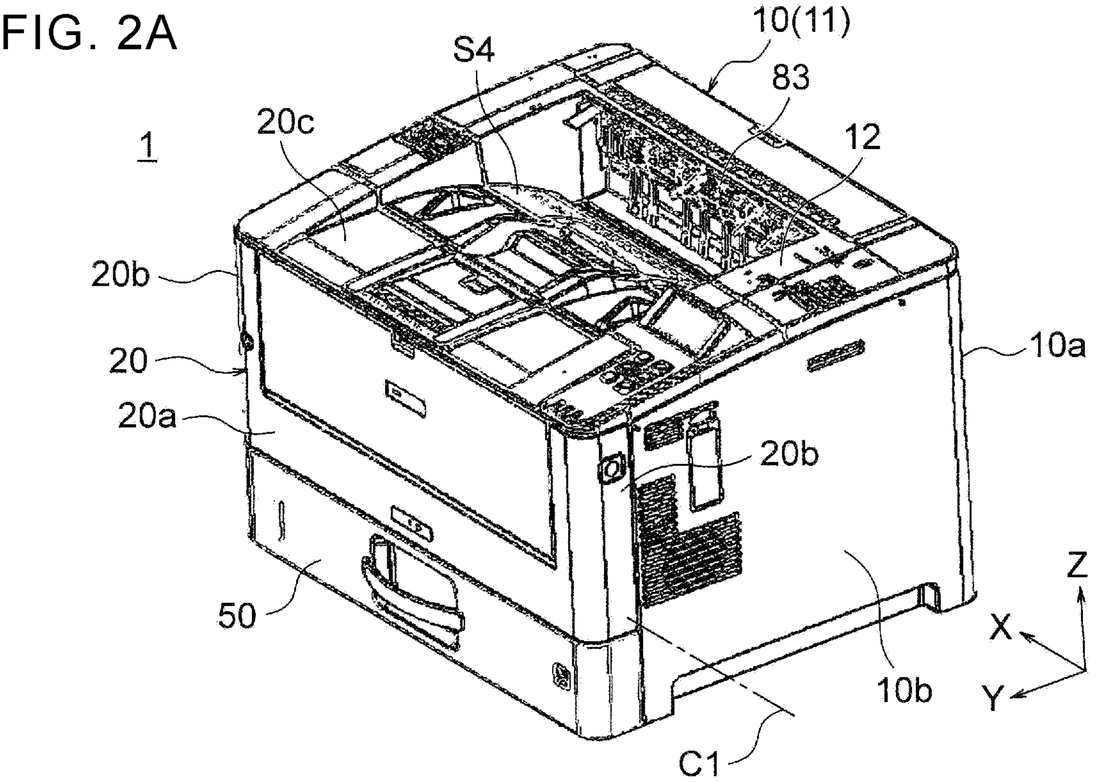
Figure 2B:
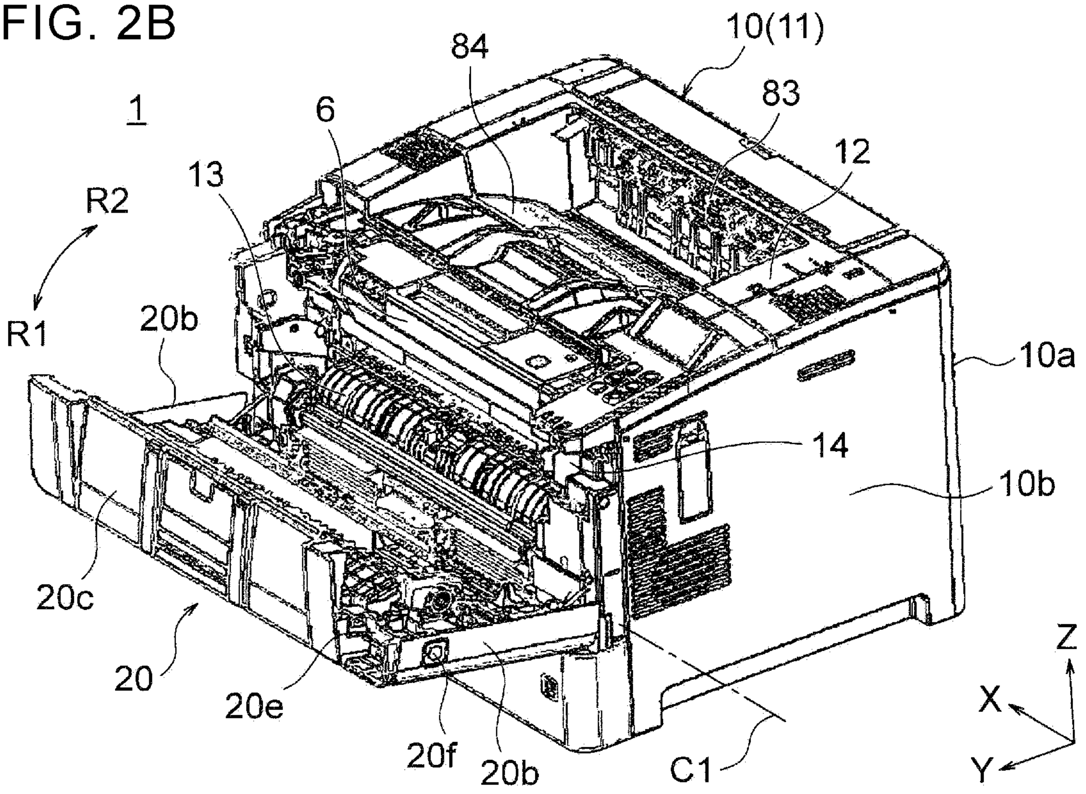

FIGS. 2A and 2B are diagrams illustrating perspective views of the image formation apparatus 1. As illustrated in FIG. 2A, the housing 10 of the image formation apparatus 1 includes a rear frame 10*a* provided on the rear (−Y direction) side and side frames 10*b* provided on the left and right sides (both sides in the X direction). The front (+Y side) of the housing 10 is covered with the front cover 20 serving as a rotation member.

The front cover 20 is pivotable (rotatable) between a closed position illustrated in FIG. 2A and an open position illustrated in FIG. 2B, about a rotation axis C1 thereof provided at a lower end portion of the front cover 20 and extending in the X direction. It may be preferable that the rotation angle between the open position and the closed position of the front cover 20 is in a range of 80 to 90 degrees. In an embodiment herein, the rotation angle is 80 degrees, for example.

When the front cover 20 is in the closed position, the front side of the housing 10 is closed by the front cover 20 as illustrated in FIG. 2A. When the front cover 20 is in the open position, the front side of the housing 10 is opened as illustrated in FIG. 2B.

The front cover 20 includes a flat plate portion 20*a* positioned at the front surface of the housing 10, side plate portions 20*b* provided at both left and right sides of the flat plate portion 20*a*, and a top plate portion 20*c* provided at the upper end of the flat plate portion 20*a* to cover the upper side of the image formation unit 6.

The front cover 20 is provided with a lock member 20*e* for locking the front cover 20 at the closed position. The lock member 20*e* locks the front cover 20 at the closed position by engaging with an engagement portion 14 provided at the side frame 10*b* of the housing 10. A side portion of the front cover 20 is provided with an unlock button 20*f* that is to be operated for unlocking the lock member 20*e*.

When the front cover 20 is at the open position, the front of the image formation unit 6 is opened and the image formation unit 6 can be removed from the housing 10 (see FIG. 10 described later). Also, a part of the medium conveyance path P1 is exposed.

Figure 3A:
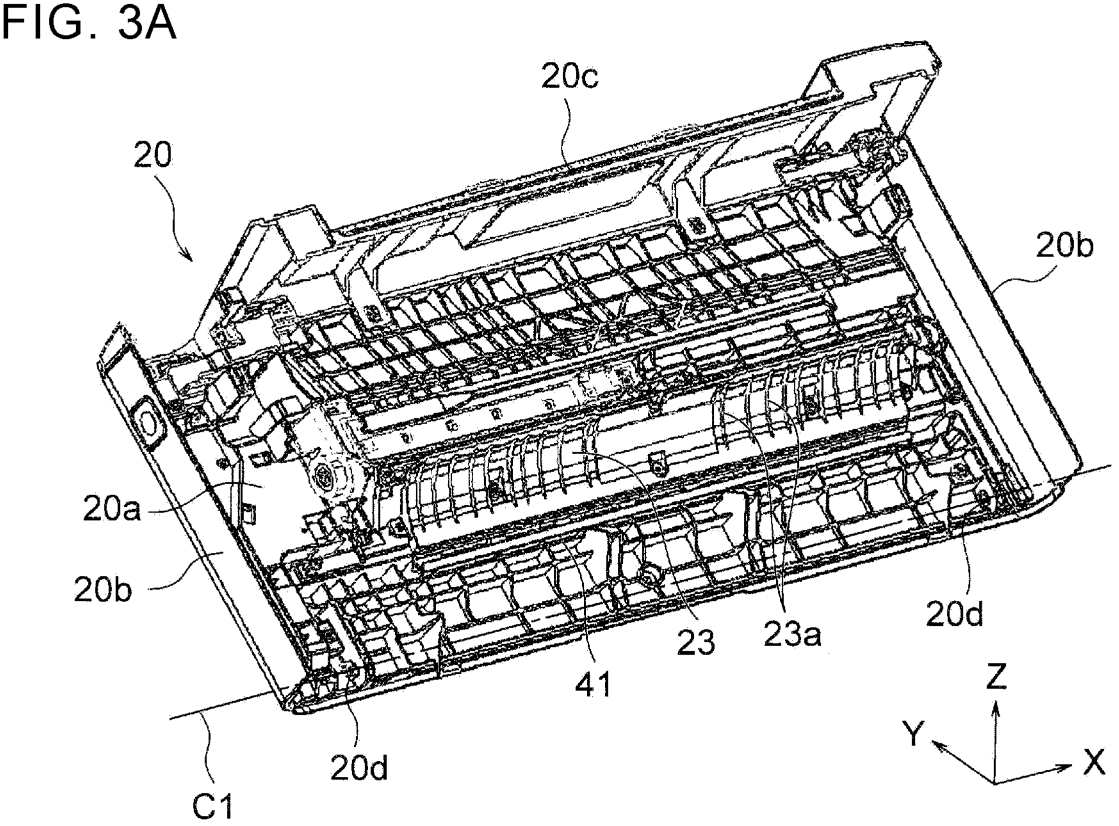
FIG. 3A is a diagram illustrating a perspective view of the front cover according to a first embodiment.
Figure 3B:
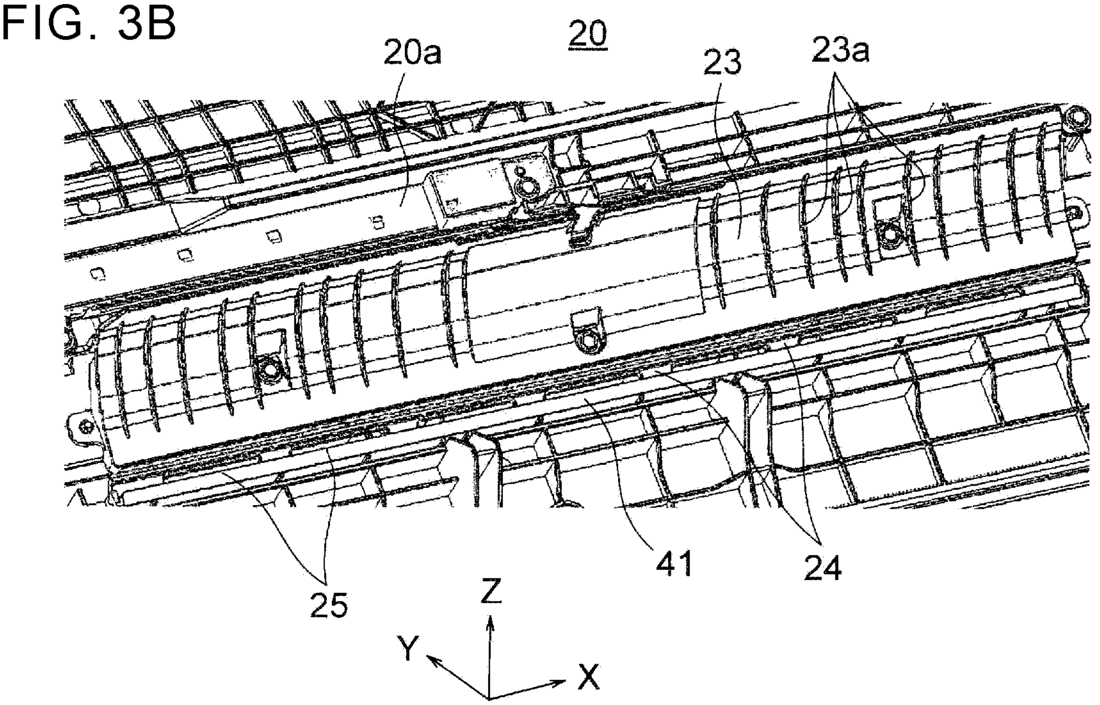
FIG. 3B is a diagram illustrating an enlarged perspective view of a part of the front cover.

FIG. 3A is a diagram illustrating a perspective view of the front cover 20. FIG. 3B is a diagram illustrating an enlarged perspective view of a part of the front cover 20. As illustrated in FIG. 3A, the lower end portion of the front cover 20 is provided with support shafts 20*d* that define the rotation axis C1 of the front cover 20 described above. The support shafts 20*d* are arranged inside the side plate portions 20*b* in the X direction.

A medium guide 23 that guides the medium M is provided at a substantially center portion of the front cover 20. A width of the medium guide 23 in the X direction is wider than a width of the largest size medium M to be used in the image formation apparatus 1.

The medium guide 23 includes, for example, a plurality of guide ribs 23*a* arranged in the X direction. Each of the guide ribs 23*a* has a curved shape within a plane perpendicular to the X direction. The medium guide 23 of the front cover 20 faces and is opposed to the medium guide 13 (FIG. 2B) of the apparatus main body 11. The medium M is conveyed between the medium guide 23 and the medium guide 13.

As illustrated in FIG. 3B, a wall portion 24 extending in the X direction is provided on the rotation axis C1 (FIG. 3A) side of the medium guide 23 of the front cover 20. The wall portion 24 is formed integrally with the medium guide 23, for example. The wall portion 24 is formed with a plurality of openings 25 arranged in the X direction.

Figure 4:
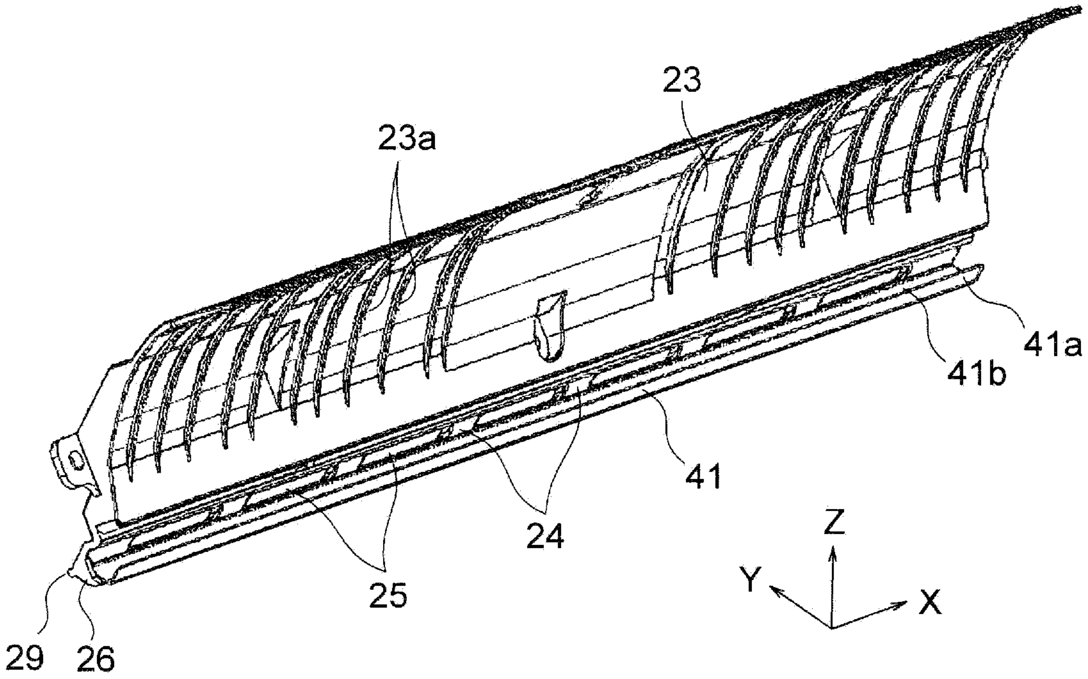
FIG. 4 is a diagram illustrating a perspective view of a medium guide of the front cover of FIG. 3.

FIG. 4 is a diagram illustrating a view of the medium guide 23 of the front cover 20 taken out. The cleaning member 41 is attached to the wall portion 24 on the side of the rotation axis C1 (FIG. 3A). The cleaning member 41 is, for example, a film made of resin.

The cleaning member 41 is long in the X direction and is bent to form an L shape in the Y-Z plane. It may be preferable that the thickness of the cleaning member 41 is 0.125 mm or less. As an example, the thickness of the cleaning member 41 is 0.1 mm. The resin forming the cleaning member 41 is, for example, polyester. Such a cleaning member 41 may be referred to as a cleaning blade.

Figure 5A:
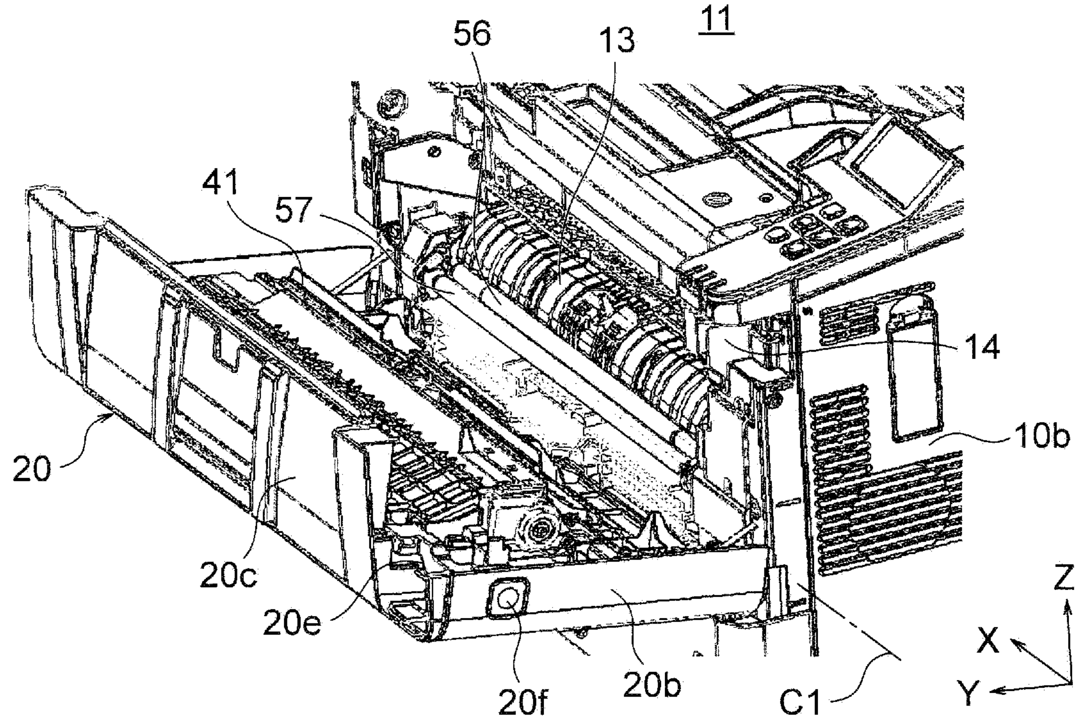
FIG. 5A is a diagram illustrating a perspective view of the front cover and the apparatus main body in a state where the front cover is in the open position as illustrated in FIG. 3.
Figure 5B:
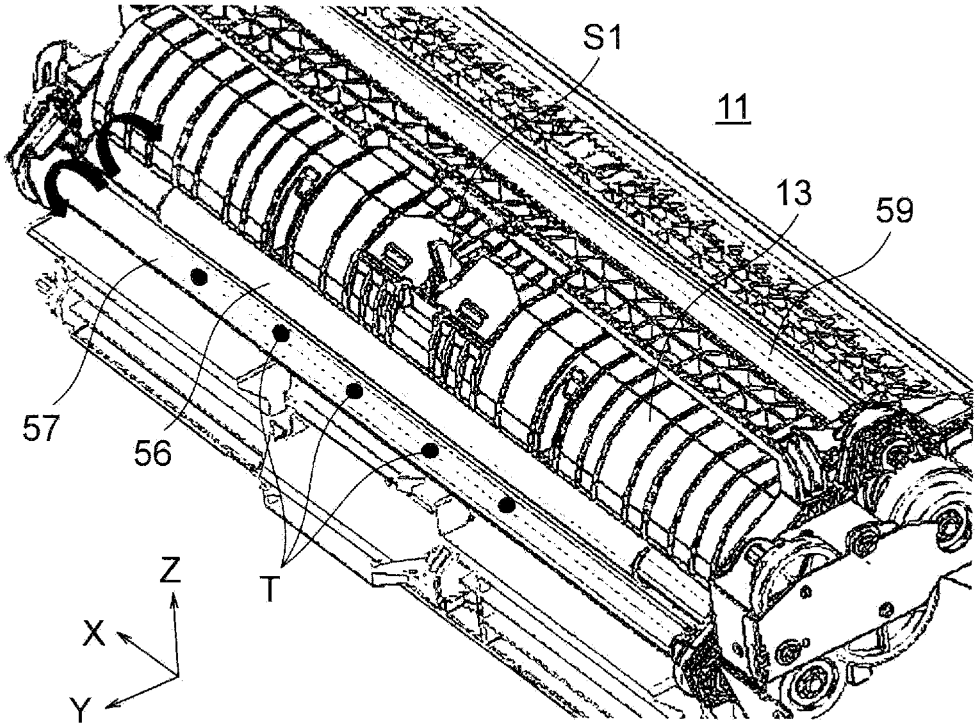
FIG. 5B is a diagram illustrating a perspective view of a conveyance roller, pinch rollers, and a medium guide in a state where the front cover is in the open position as illustrated in FIG. 3.

FIG. 5A is a diagram illustrating a perspective view of the front cover 20 and the apparatus main body 11 in the state where the front cover 20 is rotated to the open position thereof. FIG. 5B is a diagram illustrating a perspective view of the conveyance roller 56, the pinch roller 57 and the medium guide 13 of the apparatus main body 11.

As illustrated in FIG. 5A, in the state where the front cover 20 is in the open position, the conveyance roller 56 and the pinch roller 57 which are arranged on the upstream side of the medium guide 13 are exposed. The pinch roller 57 is arranged on the +Y side (on the front side) of the conveyance roller 56.

Therefore, as illustrated in FIG. 5B, there is a possibility that in operations of attaching and detaching the image formation unit 6 to and from the housing 10 (described later), matter (adherents) indicated by symbol T may adhere to the surface of the pinch roller 57.

Therefore, the cleaning member 41 illustrated in FIGS. 4 and 5A is arranged at a portion of the front cover 20 that is opposed to the pinch roller 57. When the front cover 20 is rotated to the closed position, the cleaning member 41 contacts the surface of the pinch roller 57.

Figure 6A:
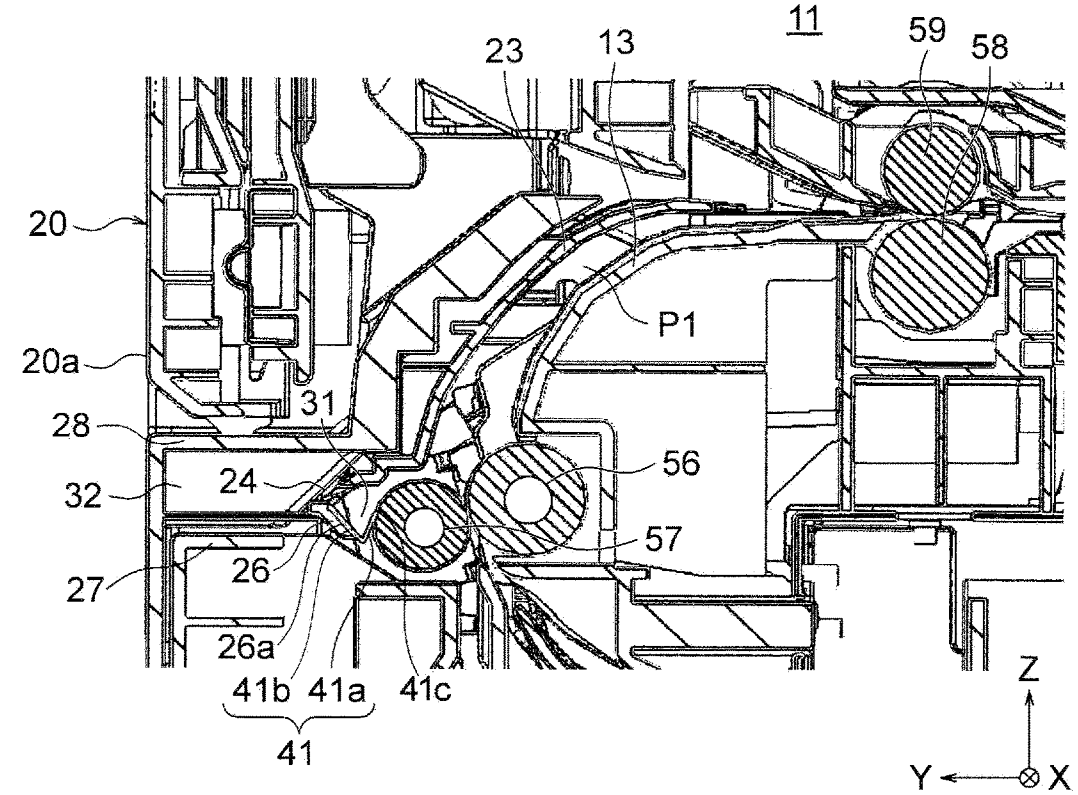
FIGS. 6A and 6B are diagrams illustrating cross sectional views of a vicinity of the pinch roller and the cleaning member in a state where the front cover is in the closed position and in a state where the front cover is in the open position in the image formation apparatus according to a first embodiment.
Figure 6B:
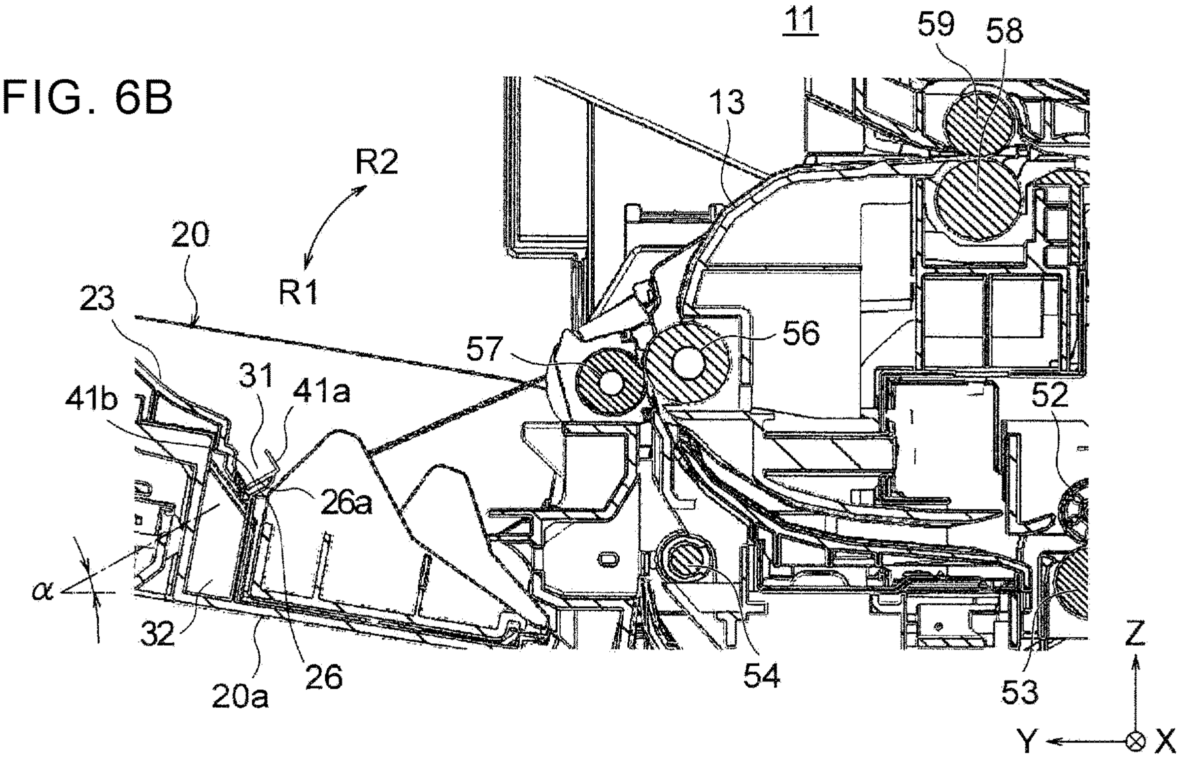

FIG. 6A is a cross sectional view illustrating the pinch roller 57, the cleaning member 41, and the surroundings thereof in the state where the front cover 20 is in the closed position. FIG. 6B is a cross sectional view illustrating the pinch roller 57, the cleaning member 41, and the surroundings thereof in the state where the front cover 20 is in the open position.

As illustrated in FIG. 6A, when the front cover 20 is in the closed position, the medium guide 23 of the front cover 20 faces and is opposed to the medium guide 13 of the apparatus main body 11. Both the medium guide 23 and the medium guide 13 extend between the pair of the conveyance roller 56 and the pinch roller 57 and the pair of the regist roller 58 and the pinch roller 59.

When the front cover 20 is in the closed position, the cleaning member 41 of the front cover 20 contacts the surface (outer circumferential surface) of the pinch roller 57. When the front cover 20 is in the closed position, the wall portion 24 is positioned above the cleaning member 41 (that is, positioned on the +Z side of the cleaning member 41).

The front cover 20 also includes a first partition plate 27 and a second partition plate 28 extending from the flat plate portion 20*a* toward the wall portion 24. The first partition plate 27 and the second partition plate 28 extend rearward (in the −Y direction) from the flat plate portion 20*a* and reach the wall portion 24.

A holding portion 26 that holds the cleaning member 41 is integrally formed at a lower end portion of the wall portion 24 (that is, an end portion of the wall portion 24 on the rotation axis C1 side). A front surface of the holding portion 26, that is, a surface of the holding portion 26 on the pinch roller 57 side is referred to as a guide surface 26*a*. A cleaning member 41 is fixed to the guide surface 26*a* of the holding portion 26 by adhesion. For adhesion, for example, a double-sided tape may be used.

The holding portion 26 extends from the wall portion 24 toward the pinch roller 57 in the state where the front cover 20 is in the closed position. The guide surface 26*a* of the holding portion 26 is inclined so as to be displaced downward as the guide surface 26*a* approaches the pinch roller 57 in the Y direction.

The cleaning member 41 includes a base portion 41*b* fixed to the guide surface 26*a* of the holding portion 26, and a bent portion 41*a* bent upward at an end of the base portion 41*b* on a side closer to the pinch roller 57 (a lower end of the base portion 41*b*). A distal end 41*c* of the bent portion 41*a* of the cleaning member 41 is in contact with the surface of the pinch roller 57.

Accordingly, when the pinch roller 57 rotates, the cleaning member 41 scrapes (removes) the adherents on the surface of the pinch roller 57. Further, the cleaning member 41 is provided such that a first storage section 31 is formed (defined) between the bent portion 41*a* and the base portion 41*b* of the cleaning member 41. The first storage section 31 is an accommodation area to contain therein the adherents that are scraped off (removed) from the pinch rollers 57.

The front cover 20 is formed with a second storage section 32 in front (on the +Y side) of the first storage section 31. Specifically, the second storage section 32 is formed (defined) between the first partition plate 27 and the second partition plate 28 of the front cover 20.

As illustrated in FIG. 6B, in the state where the front cover 20 is in the open position, the medium guide 23 of the front cover 20 is separated away from the medium guide 13 of the apparatus main body 11. In this state, the cleaning member 41 provided on the front cover 20 is separated away from the pinch roller 57. Also, the second storage section 32 is positioned below (on the −Z side of) the first storage section 31.

Further, the guide surface 26*a* of the holding portion 26 is inclined at an angle α with respect to the horizontal plane. That is, the base portion 41*b* of the cleaning member 41 fixed to the guide surface 26*a* of the holding portion 26 is also inclined at an angle α with respect to the horizontal plane. It may be preferable that the angle α is 30 degrees or more.

Figure 7A:
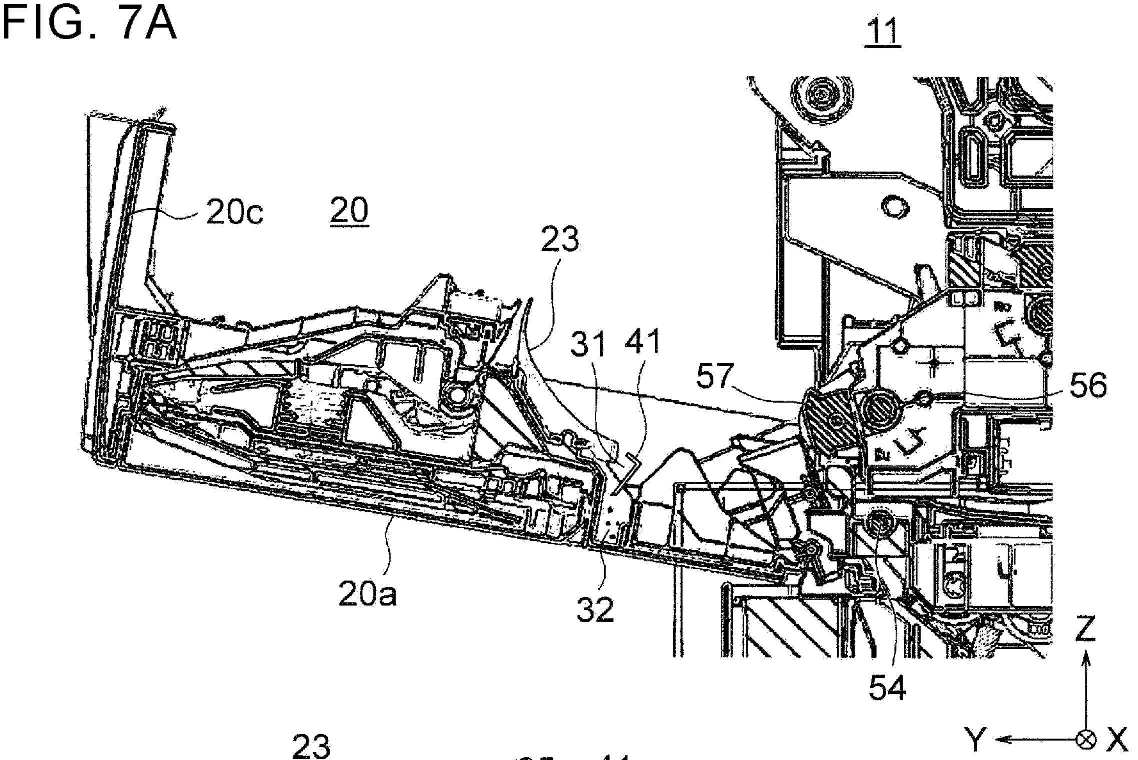
FIG. 7A is a cross sectional view illustrating the front cover and the apparatus main body in the state where the front cover is in the open position.

FIG. 7A is a cross-sectional view illustrating the front cover 20 in the open position and a portion of the apparatus main body 11 that includes the pinch roller 57. As described above, when the front cover 20 is in the open position, the second storage section 32 is located below the first storage section 31.

Figure 7B:
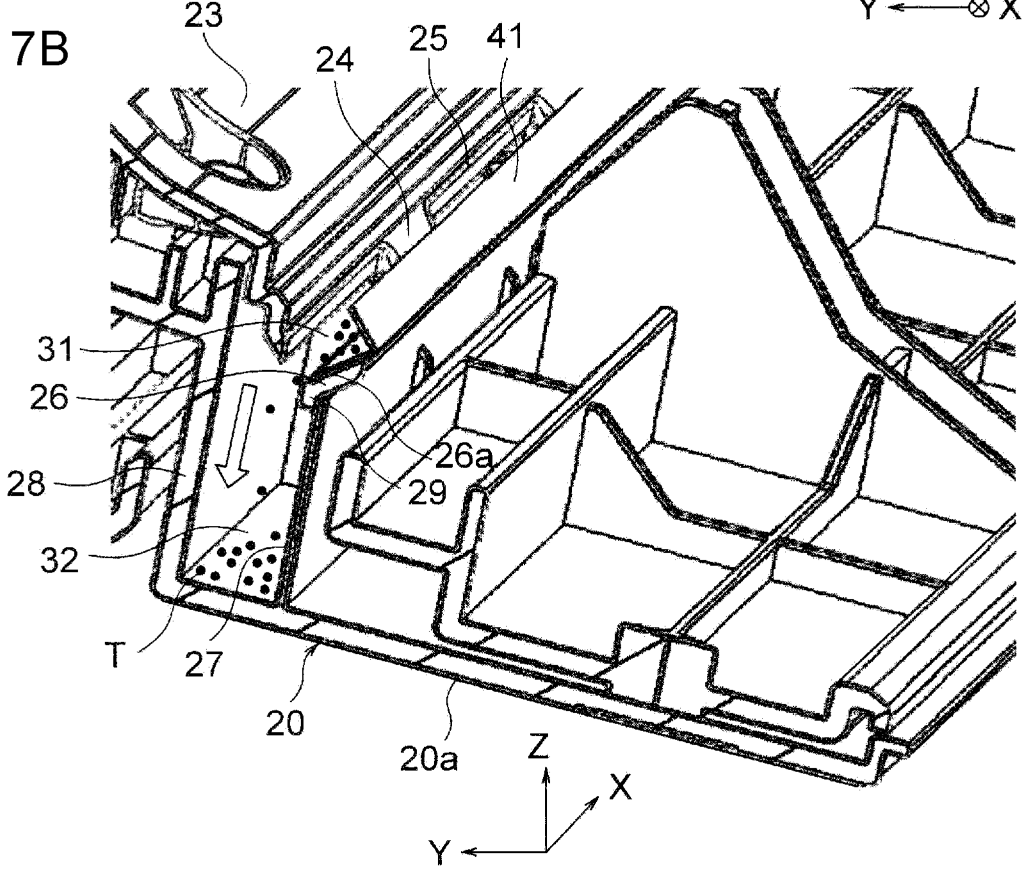
FIG. 7B is an enlarged view illustrating a part of the front cover in the state where the front cover is in the open position in the image formation apparatus according to the first embodiment.

FIG. 7B is an enlarged view illustrating the cleaning member 41, the first storage section 31, and the second storage section 32. The first storage section 31 and the second storage section 32 are separated by the wall portion 24. However, the openings 25 are formed in the wall portion 24 so that the first storage section 31 and the second storage section 32 communicate with each other through the openings 25. Accordingly, the removed adherents T in the first storage section 31 falls through the openings 25 into the second storage section 32.

Figure 8:
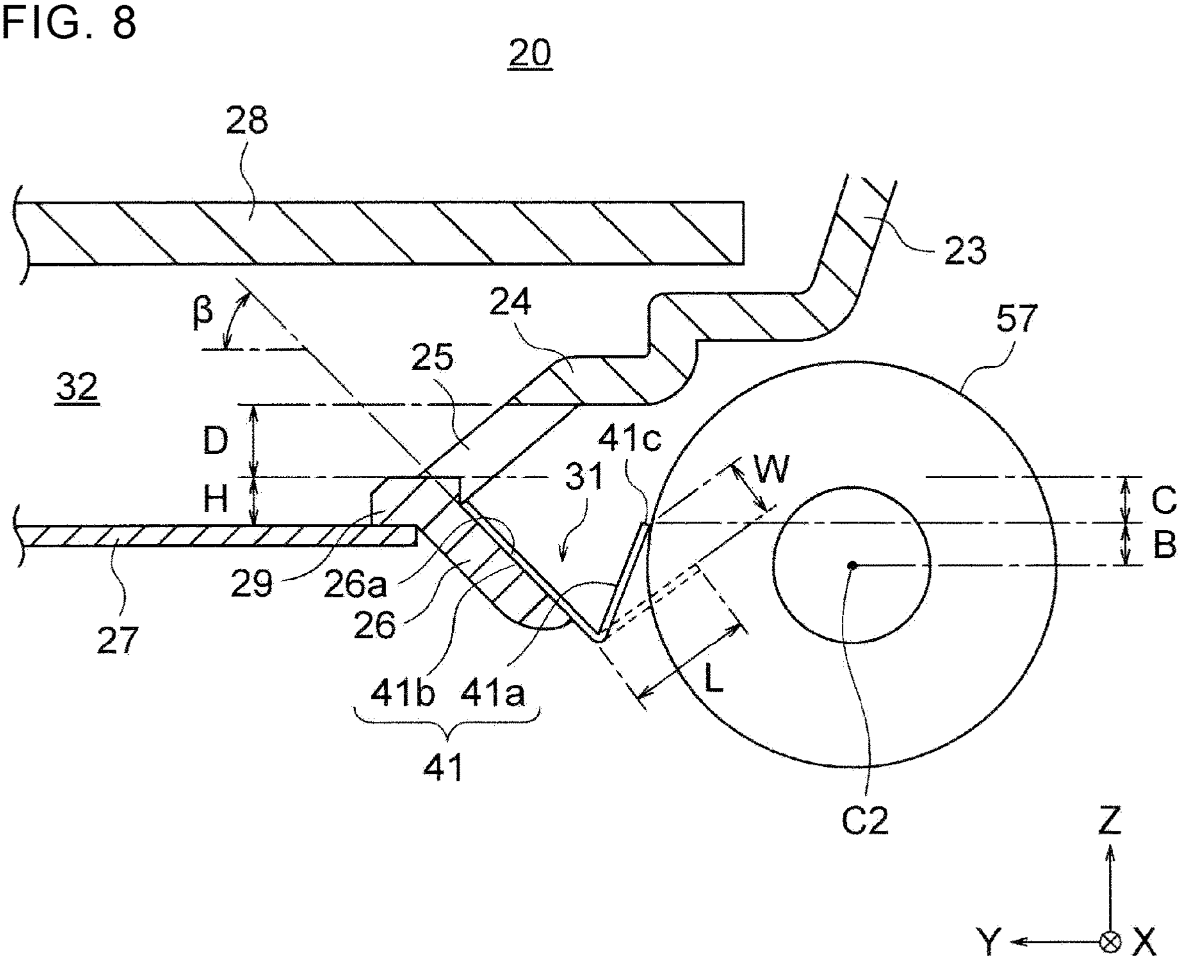
FIG. 8 is a schematic diagram illustrating the pinch roller, the cleaning member, a first storage section, and a second storage section according to a first embodiment.

FIG. 8 is a schematic diagram illustrating the cleaning member 41, the first storage section 31, and the second storage section 32 together with the pinch roller 57 in the state where the front cover 20 is in the closed position. The base portion 41*b* of the cleaning member 41 is fixed to the guide surface 26*a* of the holding portion 26, and the distal end 41*c* of the bent portion 41*a* is in contact with the pinch roller 57. A length L of the bent portion 41*a* is, for example, 3.5 to 4.5 mm (4.0 mm as an example).

An angle formed by the base portion 41*b* and the bent portion 41*a* is smaller when the bent portion 41*a* contacts the pinch roller 57 (solid line) than when the bent portion 41*a* does not contact the pinch roller 57 (broken line). That is, the cleaning member 41 contacts the surface of the pinch roller 57 in a state where the cleaning member 41 is elastically deformed so that the angle between the base portion 41*b* and the bent portion 41*a* becomes smaller.

It may be preferable that a displacement amount W of the distal end 41*c* of the cleaning member 41 due to the contact with the pinch roller 57 is 0.5 mm or more. As an example, the displace amount W of the distal end 41*c* of the cleaning member 41 is 2.0 mm. The displacement amount W of the distal end 41*c* of the cleaning member 41 may be referred to as a deflection amount of the cleaning member 41.

With the bent portion 41*a* of the cleaning member 41 being in contact with the pinch roller 57, the distal end 41*c* of the bent portion 41*a* is located upper than (on the +Z side of) the rotation axis C2 of the pinch roller 57. It may be preferable that a distance B in the Z direction between the distal end 41*c* of the bent portion 41*a* and the rotation axis C2 of the pinch roller 57 is 0 to 2 mm.

In this state, the distal end 41*c* of the bent portion 41*a* is located lower (on the −Z side) than an upper end surface of a later-described restriction portion 29 (that is, a lower end surface of the opening portion 25). A distance C in the Z direction between the distal end 41*c* of the bent portion 41*a* and the upper end surface of the restriction portion 29 is, for example, 1.0 mm.

The wall portion 24 of the medium guide 23 partitions the first storage section 31 and the second storage section 32 and is positioned above the holding portion 26. An opening dimension D of the opening 25 of the wall 24 in the Z direction is 2.0 mm or more (2.0 mm as an example).

The restriction portion 29 is located between the first partition plate 27 and the opening 25 and is formed integrally with the holding portion 26. The restriction portion 29 protrudes from the surface (wall surface) of the first partition plate 27 upwardly in the state where the front cover 20 is in the closed position.

The restriction portion 29 is configured to regulate movement of the removed adherents through the opening portions 25 between the first storage section 31 and the second storage section 32. A height H of the restriction portion 29, that is, the distance from the surface of the first partition plate 27 to the upper surface of the restriction portion 29 (that is, the lower end of the opening 25) is, for example, 2.0 mm.

(Printing Operation of Image Formation Apparatus)

Next, a printing operation of the image formation apparatus 1 is described with reference to FIG. 1. When a controller (or a control device) of the image formation apparatus 1 receives a print command and print data from a host device or an external device, the controller starts the printing operation (an image forming operation). The printing operation is performed in the state where the front cover 20 is in the closed position.

When the printing operation is started, the pickup roller 51 and the feed roller 52 of the medium feeder 5 are driven to rotate to feed the media in the media cassette 50 one by one to the medium conveyance path P1. Also, the conveyance rollers 54 and 56 are driven to rotate to convey the medium M along the medium conveyance path P1. Further, the regist roller 58 starts rotating at a predetermined timing, corrects a skew of the medium M, and convey the medium M to the image formation unit 6 along the medium conveyance path P2.

In the image formation unit 6, the charging voltage, the development voltage, and the supply voltage are applied to the charging roller 62, the development roller 65 and the supply roller 66, respectively. Also in the image formation unit 6, the photosensitive drum 61 rotates, and along with this, the charging roller 62, the development roller 65, and the supply roller 66 also rotate. The charging roller 62 uniformly charges the surface of the photosensitive drum 61. The exposure head 63 exposes the uniformly-charged surface of the photosensitive drum 61 with lights to thereby form an electrostatic latent image on the surface of the photosensitive drum 61.

The electrostatic latent image formed on the surface of the photosensitive drum 61 is developed with the toner attached to the development roller 65, and thus a toner image is formed on the surface of the photosensitive drum 61. When the toner image approaches the surface of the transfer roller 68 due to the rotation of the photosensitive drum 61, the transfer voltage is applied to the transfer roller 68.

As a result, the toner image formed on the photosensitive drum 61 is transferred onto the medium M passing between the photosensitive drum 61 and the transfer roller 68. The medium M having the toner image transferred thereon is conveyed to the fixation device 7 along the medium conveyance path P3 by the rotation of the photosensitive drum 61.

In the fixation device 7, the fixation roller 71 and the pressure roller 72 rotate with a fixation nip therebetween while the heater 73 is heated up to a predetermined fixation temperature. When the medium M passes through the fixation nip between the fixation roller 71 and the pressure roller 72, the toner image on the medium M that has not yet fixed to the medium M is pressed and heated by the fixation roller 71 and the pressure roller 72 so as to be fixed to the medium M.

The medium having the toner image fixed thereon is conveyed to the media discharging part 8. By the pair of the discharging rollers 81 and the pair of the discharging rollers 82 in the medium discharging part 8, the medium M is conveyed along the medium conveyance path P4 and discharged from the discharge port 83 to the outside. The discharged media P are stacked on the stacker 84. This completes the printing operation.

(Actions of Cleaning Member and First and Second Storage Sections)

Figure 9A:
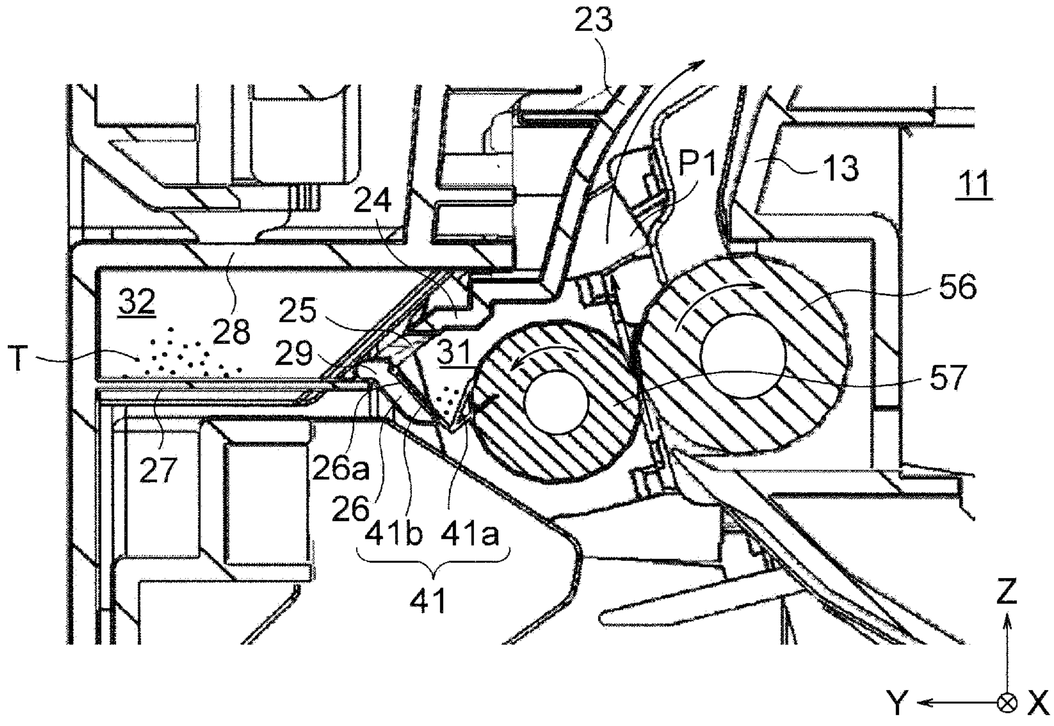
FIGS. 9A and 9B are schematic diagrams illustrating views for explaining an action of cleaning the pinch roller by the cleaning member according to a first embodiment.
Figure 9B:
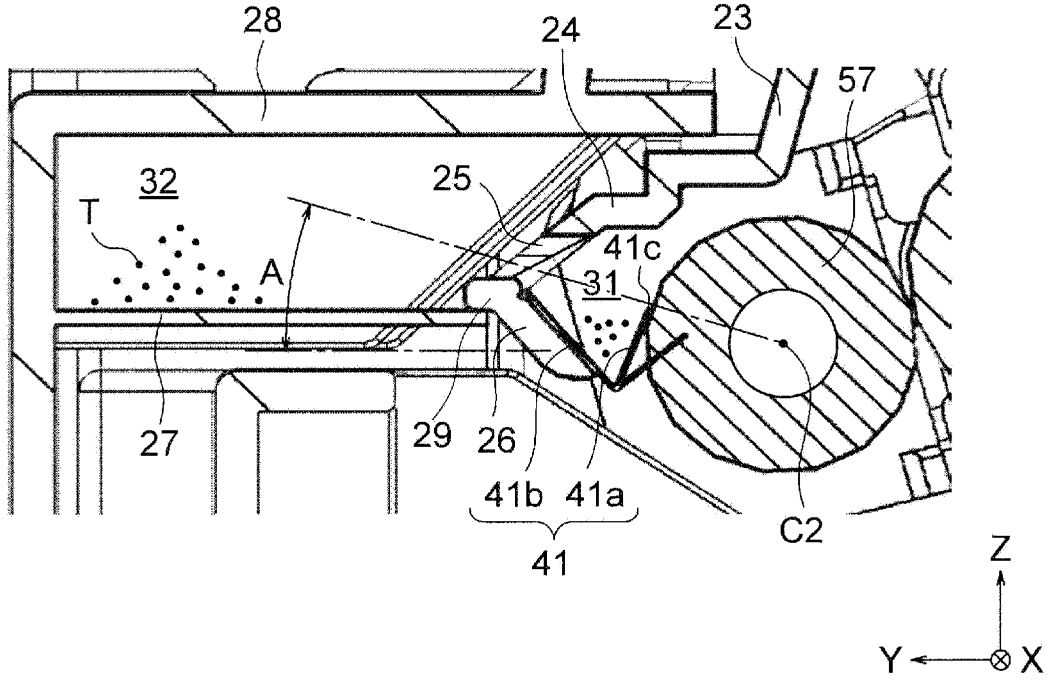

FIG. 9A is a cross-sectional view for explaining actions of the cleaning member 41, the first storage section 31, and the second storage section 32 during the printing operation. FIG. 9B is an enlarged cross-sectional view illustrating the cleaning member 41, the first storage section 31, and the second storage section 32 during the printing operation.

During the printing operation, the feed roller 52 and the retard roller 53 feed the medium M to the medium conveyance path P1. Then, the medium M is conveyed along the medium conveyance path P1 by the pair of the conveyance roller 54 and the pinch roller 55 (see FIG. 1) and the pair of the conveyance roller 56 and the pinch roller 57.

Among these rollers, the pinch rollers 55 and 57 are positioned on the most front side (+Y side), that is, closest to the front cover 20 side. The pinch roller 57 is located above the pinch roller 55.

Figure 10:
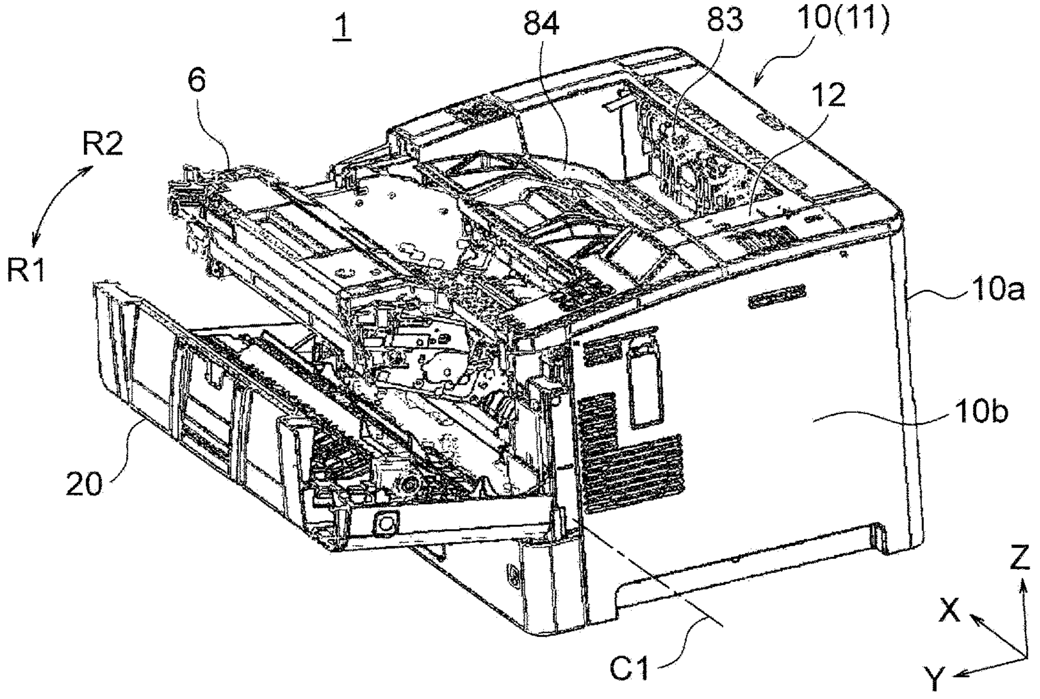
FIG. 10 is a diagram illustrating a perspective view for explaining an operation of removing the image formation unit from the image formation apparatus according to a first embodiment.

Upon replacing the image formation unit 6, the image formation unit 6 is removed upwardly forward from the housing 10 in the state where the front cover 20 is opened as illustrated in FIG. 10. At this time, the toner may fall from the image formation unit 6 and adhere to the surface of the pinch roller 57. In addition, paper dust on the medium M that is generated along with the printing operation may adhere to the surface of the pinch roller 57.

If such matters (adherents T) such as the toner and the paper dust adhere to the pinch roller 57 (see FIG. 5B), the adherents T may be transferred to the medium M when the surface (the printing surface) of the medium M comes into contact with the pinch roller 57 having the adherents T thereon, which may cause deterioration of the image quality on the medium M.

In an embodiment, the distal end 41*c* of the cleaning member 41 is in contact with the surface of the pinch roller 57 during the printing operation. In particular, the cleaning member 41 is in contact with the surface of the pinch roller 57 with the cleaning member 41 being elastically deformed to reduce the angle between the bent portion 41*a* and the base portion 41*b*. Accordingly, the distal end 41*c* of the cleaning member 41 is pressed against the surface of the pinch roller 57 due to the elastic force of the cleaning member 41.

Further, as described above, the displacement amount W (FIG. 8) of the distal end 41*c* of the cleaning member 41 due to the contact with the pinch roller 57 is 0.5 mm or more (for example, 2.0 mm). Therefore, even if an error in the bending angle of the cleaning member 41 or an error in the attachment position of the cleaning member 41 is taken into account, the adherents (the adhered matter) T are prevented from slipping through between the cleaning member 41 and the pinch roller 57. Note that the outer diameter of the pinch roller 57 is, for example, 12 mm.

It may be preferable that the distal end 41*c* of the cleaning member 41 is in contact with the surface of the pinch roller 57 in a direction counter to the movement direction of the surface of the pinch roller 57. Due to the distal end 41*c* of the cleaning member 41 being in contact with the cleaning member 41 in this manner, the adherents T adhered to the surface of the pinch roller 57 can be efficiently scraped off (removed).

Further, as described above, the distal end 41*c* of the cleaning member 41 is positioned above (on the +Z side of) the rotation axis C2 of the pinch roller 57. Therefore, the distal end 41*c* of the cleaning member 41 can be prevented from slipping under the pinch roller 57, and the adherents (the adhered matter) T can be reliably scraped off.

Further, it may be preferable that an angle (hereinafter may be referred to as a contact angle) A formed between a straight line passing through the distal end 41*c* of the cleaning member 41 and the rotation axis C2 of the pinch roller 57 and the horizontal plane as illustrated in FIG. 9B is within the range of 10 to 30 degrees. In such a configuration in which the contact angle A is within this range, the distal end 41*c* of the cleaning member 41 is pressed against the pinch roller 57 with an appropriate pressing force.

The distal end 41*c* of the cleaning member 41 scrapes off and removes the adherents T adhered to the surface of the pinch roller 57, and thus the removed adherents T falls into the area between the bent portion 41*a* and the base portion 41*b* of the cleaning member 41, that is, into the first storage section 31.

Since the first storage section 31 is spaced away from the contact portion between the cleaning member 41 and the pinch roller 57 (that is, the distal end 41*c* of the cleaning member 41), the removed adherents accommodated in the first storage section 31 is difficult to adhere to the pinch roller 57 again.

It may be preferable that when the front cover 20 is in the closed position, an angle β (FIG. 8) of the base portion 41*b* of the cleaning member 41 with respect to the horizontal plane is 20 to 50 degrees. In the configuration in which the angle ß is within this range, the volume of the first storage section 31 can be sufficiently secured and the lengths of the bent portion 41*a* and the base portion 41*b* of the cleaning member 41 can be secured. That is, it is possible to prevent insufficient pressing force against the pinch roller 57 when the length of the bent portion 41*a* is short, or to prevent separation from the holding portion 26 when the length of the base portion 41*b* is short.

As the printing operation is repeated, the amount of the removed adherents T accommodated in the first storage section 31 gradually increases.

When the front cover 20 is rotated to the open position, the second storage section 32 is positioned below (on the −Z side of) the first storage section 31 as illustrated in FIGS. 6B and 7B. Accordingly, the removed adherents T accommodated in the first storage section 31 falls into the second storage section 32 through the openings 25 formed in the wall portion 24 and is thus accommodated in the second storage section 32.

In the state where the front cover 20 is in the open position, it may be preferable that the angle α (FIG. 6B) of the base portion 41*b* of the cleaning member 41 with respect to the horizontal plane is 30 degrees or more. In the configuration in which the angle α is 30 degrees or more, the removed adherents T can be smoothly slid off the base 41*b* of the cleaning member 41 and dropped into the second storage section 32.

The opening and closing of the front cover 20 is performed upon replacing the image formation unit 6, upon clearing the jam, or the like. It is assumed that the front cover 20 is opened and closed about 500 times over the life of the image formation apparatus 1. Therefore, it is assumed that the movement of the removed adherents T from the first storage section 31 to the second storage section 32 is performed about 500 times. The second storage section 32 has a sufficient capacity to accommodate the removed adherents T generated over the life of the image formation apparatus 1.

After the removed adherents T are dropped from the first storage section 31 to the second storage section 32, the front cover 20 is rotated to the closed position. As a result, the printing operation can be restarted with the removed adherents T being accommodated in the second storage section 32 as illustrated in FIGS. 9A and 9B. When the printing operation is restarted, the adherents T scraped (removed) from the surface of the pinch roller 57 by the cleaning member 41 will be stored in the first storage section 31. To the contrary, the second storage section 32 accommodates the removed adherents T that has fallen from the first storage section 31 when the front cover 20 is opened.

The restriction portion 29 is arranged between the first storage section 31 and the second storage section 32. When the front cover 20 is in the closed position, the height H (FIG. 8) of the restriction portion 29 is set to a height (for example, 2.0 mm) at which the removed adherents in the second storage section 32 cannot easily climb over. Therefore, it is possible to prevent the removed adherents accommodated in the second storage section 32 from returning to the first storage section 31 and overflowing from the first storage section 31 during the printing operation.

Figure 11:
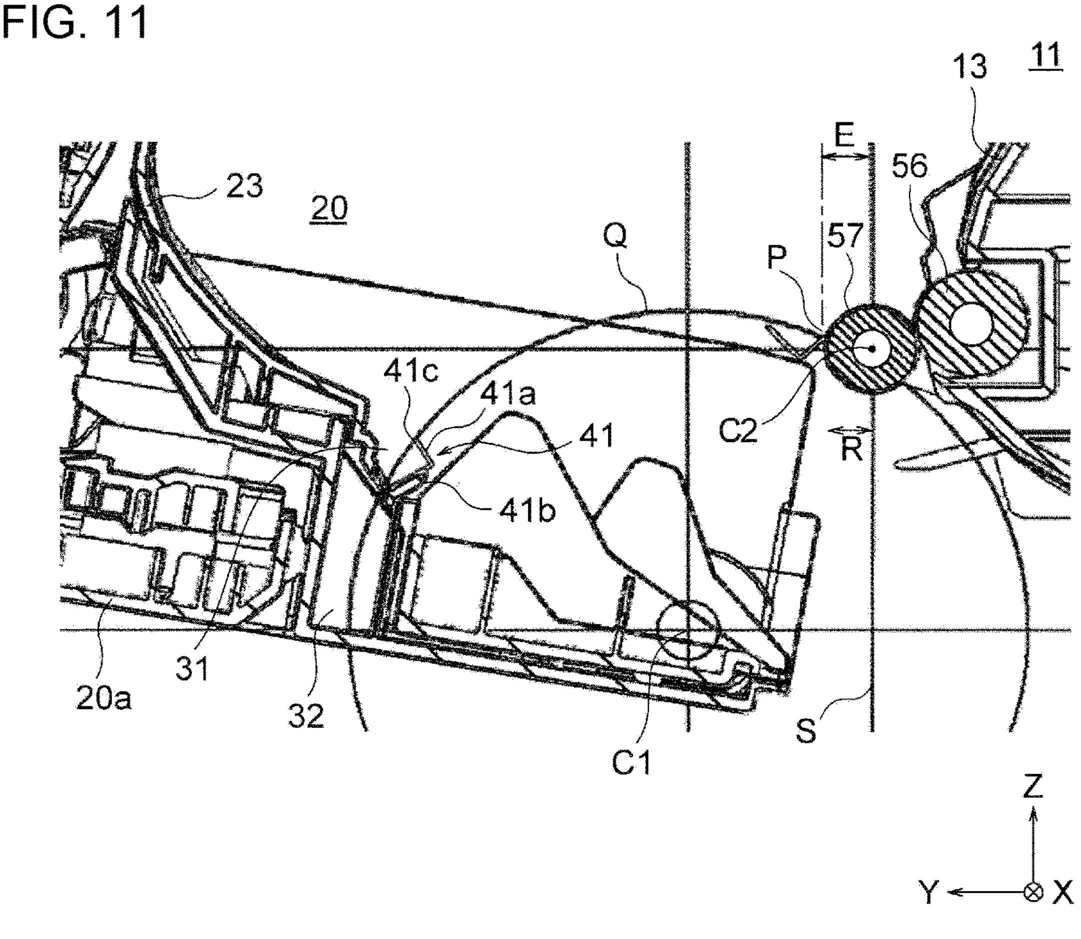
FIG. 11 is a diagram illustrating a movement trajectory of the cleaning member upon opening and closing of the front cover according to a first embodiment.

FIG. 11 is a diagram illustrating a movement locus of the distal end 41*c* of the cleaning member 41 as the front cover 20 is opened and closed. When the front cover 20 is rotated from the open position to the closed position, the distal end 41*c* of the cleaning member 41 moves along the locus illustrated by the circle Q in FIG. 11 and then comes into contact with the pinch roller 57.

A position where the distal end 41*c* of the cleaning member 41 starts contacting the pinch roller 57 when the front cover 20 is rotated to the closed position is referred to as a contact start position P. A vertical plane (a straight line in FIG. 11) passing through the rotation axis C2 of the pinch roller 57 is referred to as a reference plane S. It may be preferable that the distance E from the reference plane S to the contact start position P is 90% or less of the radius R of the pinch roller 57 and is as large as possible. With this configuration, it is possible to prevent the cleaning member 41 from slipping under the pinch roller 57 and furthermore, it is possible to scrape off the adherents adhered to the pinch roller 57 over a wide range.

Here, the removing of the adherents adhered on the pinch roller 57 and the accommodation of the removed adherents have been described. However, the configuration of the cleaning member 41, the first storage section 31, the second storage section 32, and the like according to an embodiment is not limited to apply to the pinch roller 57, but may be applicable to remove and accommodate adherents on any rollers involved in conveying the medium M.

(Effects)

As described above, the image formation apparatus 1 according to an embodiment includes the apparatus main body 11, the pinch roller 57 attached to the apparatus main body 11 for conveying the medium M, and the front cover 20 serving as the pivot member (rotation member) pivotable (rotatable) between the closed position and the open position with respect to the apparatus main body 11. The front cover 20 includes: the cleaning member 41 is in contact with the pinch roller 57 in the state where the front cover 20 is in the closed position so as to remove the adhered matters (adherents T) from the pinch roller 57, the first storage section 31 that is provided away from the contact position between the cleaning member 41 and the pinch roller 57 and configured to accommodate the removed adherents T removed by the cleaning member 41; and the second storage section 32 that communicates with the first storage section 31 through the openings 25 and configured to accommodate therein the removed adherents T. When the front cover 20 is rotated from the closed position to the open position, the removed adherents T accommodated in the first storage section 31 moves to the second storage section 32.

As described above, when the front cover 20 pivots (rotates) from the closed position to the open position, the removed adherents T accommodated in the first storage section 31 move to the second storage section 32. Accordingly, even if the amount of the removed adherents T increases, it is possible to prevents the removed adherents T from being adhered to the medium M. As a result, deterioration of the image quality on the medium can be suppressed.

Further, the restriction portion 29 that is configured to restrict the movement of the removed adherents T from the second storage section 32 to the first storage section 31 is provided. This configuration prevents the removed adherents accommodated in the second storage section 32 from moving back to the first storage section 31, which thus prevents the removed adherents T from overflowing from the first storage section 31.

The restriction portion 29 protrudes upward from the surface (wall surface) of the first partition plate 27 defining the bottom surface of the second storage section 32 when the front cover 20 is in the closed position. With this configuration, when the front cover 20 is in the closed position, it is difficult for the removed adherents T in the second storage section 32 to return to the first storage section 31.

Further, when the front cover 20 is at the closed position, the first storage section 31 is positioned lower than the second storage section 32, and when the front cover 20 is at the open position, the first storage section 31 is positioned upper than the second storage section 32. Therefore, during the printing operation, the adherents removed from the pinch roller 57 are accommodated in the first storage section 31, and when the front cover 20 is opened, the removed adherents are moved from the first storage section 31 to the second storage section 32.

Further, the holding portion 26 includes the guide surface 26*a* configured to guide the adherents from the first storage section 31 toward the openings 25, and the guide surface 26*a* is inclined downwardly toward the pinch roller 57 in the state where the front cover 20 is in the closed position. Further, the cleaning member 41 is the film that includes: the base portion 41*b* attached to the guide surface 26*a*; and the bent portion 41*a* that is bent upward at the end of the base portion 41*b* on the side closer to the pinch roller 57 and configured to come in contact with the pinch roller 57, wherein the first storage section 31 is formed (defined) between the base portion 41*b* and the bent portion 41*a*. Therefore, the cleaning member 41 having such a simple structure can remove the adherents from the pinch roller 57, and store the removed adherents in the first storage section 31 and move the removed adherents to the second storage section 32.

Further, when the front cover 20 is pivoted from the closed position to the open position, the removed adherents moves toward the openings 25 along the guide surface 26*a* of the holding portion 26. Accordingly, this configuration can move the removed adherents T to the second storage section 32 through the openings 25 without scattering the adherents T.

Further, when the front cover 20 is in the open position, the guide surface 26*a* of the holding portion 26 forms an angle of 30 degrees or more with respect to the horizontal plane. Therefore, the removed adherents can easily slide down on the guide surface 26*a* of the holding portion 26 along the base portion 41*b*, and the removed adherents can be efficiently moved to the second storage section 32.

Further, the cleaning member 41 contacts the pinch roller 57 while being elastically deformed so that the angle formed by the base portion 41*b* and the bent portion 41*a* becomes smaller. With this configuration, it is possible to press the distal end 41c of the cleaning member 41 against the pinch roller 57 so as to prevent the removed adherents from passing therethrough.

Further, when the front cover 20 is in the closed position, the contact portion between the cleaning member 41 and the pinch roller 57 is positioned upper than the rotation axis C2 of the pinch roller 57. Therefore, the distal end 41*c* of the cleaning member 41 is prevented from getting under the pinch roller 57, and thus the adherents can be efficiently removed by the cleaning member 41.

Further, since the front cover 20 pivots (rotates) 80 degrees or more between the open position and the closed position, the direction (the orientation) of the cleaning member 41 can be greatly changed by the rotation of the front cover 20. Therefore, it is possible to efficiently perform by the cleaning member 41 the removal of the adherents, the storage of the removed adherents in the first storage section 31, and the movement of the removed adherents to the second storage section 32.

Further, the cleaning member 41 and the storage sections 31 and 32 are provided on an openable and closable cover (specifically, the front cover 20) that is provided on one of the side surfaces of the apparatus main body 11. Accordingly, a space for the cleaning member 41 and the storage sections 31 and 32 can be easily secured. Further, the cleaning member 41 and the storage sections 31 and 32 do not interfere with clearing a paper jam or the like, and thus clearing a paper jam or the like can be easily performed. Furthermore, it is possible to suck the removed adherents in the first storage section 31 with a vacuum cleaner or the like.

The removal of the adherents by the cleaning member 41, the storage of the removed adherents in the first storage section 31, and the movement of the removed adherents to the second storage section 32 are may be performed by rotation of a pivot member provided in the apparatus main body 11, instead of the rotation of the front cover 20.

(Modifications)

Figure 12A:
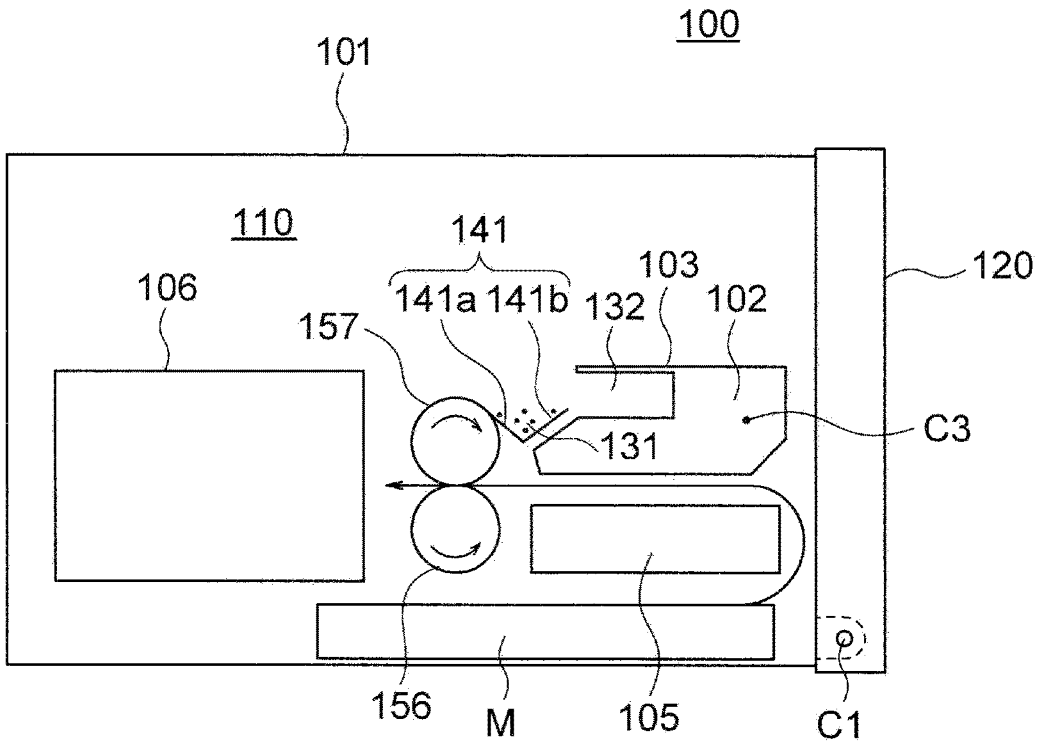
FIGS. 12A and 12B are schematic diagrams illustrating views of a state in which a pivot member is in a closed position and a state in which the pivot member is in an open position in an image formation apparatus according to a modification.
Figure 12B:
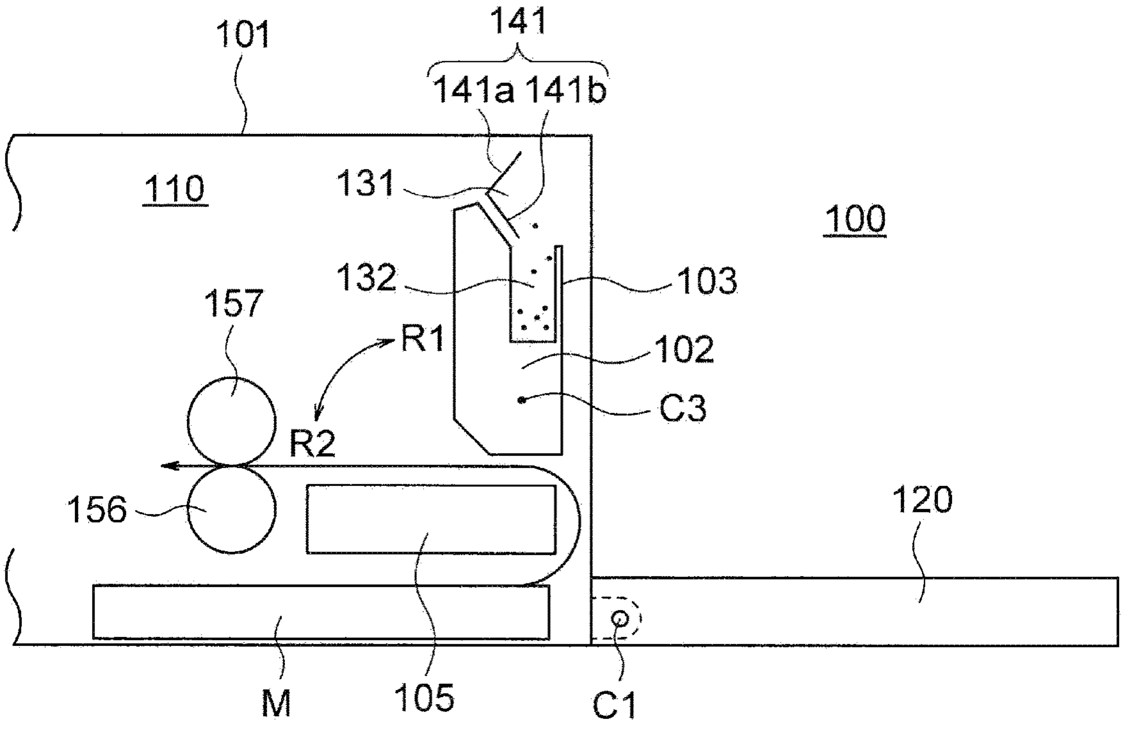

FIGS. 12A and 12B are schematic diagrams illustrating an image formation apparatus 100 according to a modification. The image formation apparatus 100 includes an apparatus main body 110 and a front cover 120. As illustrated in FIGS. 12A and 12B, the apparatus main body 110 includes a medium feeder 105 configured to supply media M, an image formation unit 106 configured to form images on the media M, and a housing 101 that houses therein the medium feeder 105 and the image formation unit 106. A pair of a conveyance roller 156 and a pinch roller 157, which is a cleaning target roller to be cleaned, is provided between the medium feeder 105 and the image formation unit 106.

The front cover 120 is pivotable (rotatable) with respect to the housing 101 about a rotation axis C1 extending in the X direction between a closed position illustrated in FIG. 12A and an open position illustrated in FIG. 12B. A pivot member 102 is provided on an inner side than the front cover 120 in the housing 101, such that the pivot member 102 is configured to be pivoted (rotated) when releasing a jam of the medium M or the like.

The pivot member 102 is pivotable (rotatable), about a rotation axis C3 extending in the X direction, between a closed position illustrated in FIG. 12A and an open position illustrated in FIG. 12B. The pivot member 102 is provided with a lever 103 that is to be gripped by the user when pivoting the pivot member 102.

As illustrated in FIG. 12A, a cleaning member 141 is fixed to an end of the pivot member 102 that faces and is opposed to the pinch roller 157 in the state where the pivot member 102 is in the closed position. The cleaning member 141 is, for example, a film and includes a base portion 141*b* fixed to the pivot member 102 and a bent portion 141*a* that comes in contact with the pinch roller 157.

The bent portion 141*a* and the base portion 141*b* of the cleaning member 141 are configured in a same as or a similar manner to the bent portion 41*a* and the base portion 41*b* of the cleaning member 41 described above in a first embodiment. A first storage section 131 for accommodating removed adherents T is formed between the bent portion 141*a* and the base portion 141*b*.

The pivot member 102 also includes a second storage section 132 which is a hollow portion that opens toward the cleaning member 141.

As illustrated in FIG. 12B, when the pivot member 102 is in the open position, the cleaning member 141 is separated from the pinch roller 157 and the second storage section 132 is positioned below the first storage section 131. Also, the base portion 141*b* of the cleaning member 141 is inclined downward toward the second storage section 132.

During the printing operation, the distal end of the bent portion 141*a* of the cleaning member 141 is in contact with a surface of the pinch roller 157, as illustrated in FIG. 12A. The adherents T adhered on the surface of the pinch roller 157 are scraped off (that is, removed) by the cleaning member 141 and then accommodated in the first storage section 131.

When a jam of the medium M occurs, the user rotates the front cover 120 to the open position of the front cover 102 and then rotates the pivot member 102 to the open position of the pivot member 102 as illustrated in FIG. 12B. As a result, the removed adherents T accommodated in the first storage section 131 slide down along the base portion 141*b* of the cleaning member 141 and fall into the second storage section 132.

Except for the structures described above, the configuration of the image formation apparatus 100 according to this modification is the same as or similar to the configuration of the image formation apparatus 1 according to a first embodiment and thus the explanation thereof is omitted for avoid redundancies.

Also in this modification, when the pivot member 102 is pivoted from the closed position to the open position, the removed adherents T accommodated in the first storage section 31 moves to the second storage section 132. Therefore, it is possible to prevent the removed adherents T from adhering to the medium M even if the amount of the removed adherents T increases. As a result, deterioration of the image quality on the medium can be suppressed.

Although one or more embodiments and modifications have been described above, the disclosure is not limited thereto, and various improvements or modifications can be made. Also, one or more embodiments and modifications described above can be combined as appropriate.

Although in one or more embodiments and modifications described above, the case has been described in which the printer is an example of the image formation apparatus. However, one or more embodiments and modifications described above can be also used in copiers, facsimiles, MFPs (multi-functional peripherals), and etc. as an image formation apparatus.

Aspects of the disclosure may be described below as appendices.

(Appendix 1) An image formation apparatus comprising:

an apparatus main body including an image formation unit;

a roller attached to the apparatus main body and configured to convey a medium; and a pivot member provided pivotable about a rotation axis between a closed position and an open position with respect to the apparatus main body, wherein the pivot member includes:

a cleaning member that is in contact with the roller to thereby remove adherents adhered to the roller from the roller in a state where the pivot member is in the closed position;

a first storage section spaced apart from a contact position between the cleaning member and the roller and provided to accommodate the adherents removed by the cleaning member; and a second storage section that is provided communicating with the first storage section through an opening and configured to accommodate therein the removed adherents, wherein the pivot member is configured such that the removed adherents that is accommodated in the first storage section moves from the first storage section to the second storage section when the pivot member pivots from the closed position to the open position.

(Appendix 2) The image formation apparatus according to Appendix 1, further comprising:

a restriction portion that restricts movement of the removed adherents from the second storage section to the first storage section through the opening.

(Appendix 3) The image formation apparatus according to Appendix 2, wherein the second storage section includes a wall surface that defines a bottom surface of the second storage section in the state where the pivot member is in the closed position, and the restricting portion projects upwardly from the wall surface in the state where the pivot member is in the closed position.

(Appendix 4) The image formation apparatus according to any one of Appendices 1 to 3, wherein the first storage section is located a position lower than the second storage section in the state where the pivot member is at the closed position, and the first storage section is located at a position upper than the second storage section in the state where the pivot member is at the open position.

(Appendix 5) The image formation apparatus according to any one of Appendices 1 to 4, wherein the cleaning member is a cleaning blade that is in contact with the roller so as to scrape off the adherents from the roller.

(Appendix 6) The image formation apparatus according to any one of Appendices 1 to 5, further comprising a guide surface that guides the removed adherents from the first storage section toward the opening, wherein the guide surface is inclined downward in a direction from the opening toward the roller in the state where the pivot member is in the closed position.

(Appendix 7) The image formation apparatus according to Appendix 6, wherein the cleaning member comprises a film that includes a base portion attached to the guide surface and a bent portion that is bent upward at an end of the base portion on a side closer to the roller and configured to be in contact with the roller, and the first storage section is formed between the base portion and the bent portion.

(Appendix 8) The image formation apparatus according to Appendix 7, wherein when the pivot member moves from the closed position to the open position, the removed adherents moves along the guide surface toward the opening.

(Appendix 9) The image formation apparatus according to Appendices 7 or 8, wherein when the pivot member is in the open position, the guide surface forms an angle of 30 degrees or more with respect to a horizontal plane.

(Appendix 10) The image formation apparatus according to any one of Appendices 7 to 9, wherein the cleaning member is in contact with the roller with the cleaning member being elastically deformed to reduce the angle between the base portion and the bent portion.

(Appendix 11) The image formation apparatus according to any one of Appendices 1 to 10, wherein when the pivot member is in the closed position, a contact portion between the cleaning member and the roller is located at a position upper than a rotation axis of the roller.

(Appendix 12) The image formation apparatus according to any one of Appendices 1 to 11, wherein an angle by which the pivot member pivots from the open position to the closed position is 80 degrees or more.

(Appendix 13) The image formation apparatus according to any one of Appendices 1 to 12, wherein the pivot member is an openable/closable cover provided on one of side surfaces of the apparatus main body.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:

an apparatus main body including an image formation unit;

a roller attached to the apparatus main body and configured to convey a medium; and a pivot member provided pivotable about a rotation axis between a closed position and an open position with respect to the apparatus main body, wherein the pivot member includes:

a cleaning member that is in contact with the roller to thereby remove adherents adhered to the roller from the roller in a state where the pivot member is in the closed position;

a first storage section spaced apart from a contact position between the cleaning member and the roller and provided to accommodate the adherents removed by the cleaning member; and a second storage section that is provided communicating with the first storage section through an opening and configured to accommodate therein the removed adherents, wherein the pivot member is configured such that the removed adherents that is accommodated in the first storage section moves from the first storage section to the second storage section when the pivot member pivots from the closed position to the open position, and the image formation apparatus further comprises a restriction portion that restricts movement of the removed adherents from the second storage section to the first storage section through the opening.

2. The image formation apparatus according to claim 1, wherein the second storage section includes a wall surface that defines a bottom surface of the second storage section in a state where the pivot member is in the closed position, and the restriction portion protrudes upward from the wall surface in the state where the pivot member is in the closed position.

3. The image formation apparatus according to claim 1, wherein in the state where the pivot member is in the closed position, the first storage section is located lower than the second storage section, and in the state where the pivot member is in the open position, the first storage section is located upper than the second storage section.

4. The image formation apparatus according to claim 1, wherein the cleaning member is a cleaning blade that is configured to be in contact with the roller so as to scrape off the adherents from the roller.

5. An image formation apparatus comprising:

an apparatus main body including an image formation unit:

a roller attached to the apparatus main body and configured to convey a medium; and a pivot member provided pivotable about a rotation axis between a closed position and an open position with respect to the apparatus main body, wherein the pivot member includes:

a cleaning member that is in contact with the roller to thereby remove adherents adhered to the roller from the roller in a state where the pivot member is in the closed position:

a first storage section spaced apart from a contact position between the cleaning member and the roller and provided to accommodate the adherents removed by the cleaning member; and a second storage section that is provided communicating with the first storage section through an opening and configured to accommodate therein the removed adherents, wherein the pivot member is configured such that the removed adherents that is accommodated in the first storage section moves from the first storage section to the second storage section when the pivot member pivots from the closed position to the open position, and the image formation apparatus further comprises a guide surface that guides the removed adherents from the first storage section toward the opening, wherein the guide surface is inclined downward in a direction from the opening toward the roller in the state where the pivot member is in the closed position.

6. The image formation apparatus according to claim 5, wherein the cleaning member comprises a film that includes a base portion attached to the guide surface and a bent portion that is bent upward at an end of the base portion on a side closer to the roller and configured to be in contact with the roller, and the first storage section is formed between the base portion and the bent portion.

7. The image formation apparatus according to claim 6, wherein when the pivot member moves from the closed position to the open position, the removed adherents moves along the guide surface toward the opening.

8. The image formation apparatus according to claim 6, wherein in the state where the pivot member is in the open position, an angle of the guide surface with respect to a horizontal plane is 30 degrees or more.

9. The image formation apparatus according to claim 6, wherein the cleaning member is in contact with the roller with the cleaning member being elastically deformed to reduce an angle between the base portion and the bent portion.

10. The image formation apparatus according to claim 1, wherein when the pivot member is in the closed position, a contact portion between the cleaning member and the roller is located at a position upper than a rotation axis of the roller.

11. The image formation apparatus according to claim 1, wherein an angle by which the pivot member pivots from the open position to the closed position is 80 degrees or more.

12. The image formation apparatus according to claim 1, wherein the pivot member is an openable/closable cover provided on one of side surfaces of the apparatus main body.

13. An image formation apparatus comprising:

an apparatus main body including an image formation unit;

a roller configured to convey a medium; and a pivot member provided pivotable about a rotation axis between a closed position and an open position with respect to the apparatus main body, wherein the pivot member includes:

a cleaning member that is in contact with the roller to thereby remove adherents adhered to the roller from the roller in a state where the pivot member is in the closed position;

a first storage section provided to accommodate the adherents removed by the cleaning member; and a second storage section that is provided communicating with the first storage section through an opening and configured to accommodate therein the removed adherents, wherein when the pivot member is in the closed position, the first storage section is located lower than a lower end of the opening communicating with the second storage section, and when the pivot member pivots from the closed position toward the open position by a predetermined angle, the first storage section is located upper than the lower end of the opening communicating with the second storage section such that the removed adherents that is accommodated in the first storage section moves from the first storage section to the second storage section.

* * * * *